United States Patent
Mullens et al.

(10) Patent No.: US 6,363,070 B1
(45) Date of Patent: Mar. 26, 2002

(54) METHOD FOR SELECTING VIRTUAL END NODES IN AN RF NETWORK

(75) Inventors: Lanny Joe Mullens, Scottsdale; David Wallis, Phoenix; Eric Eckert, Glendale, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/108,462

(22) Filed: Jul. 1, 1998

(51) Int. Cl.[7] .............................................. H04L 12/28
(52) U.S. Cl. ........................ 370/389; 370/358; 370/392
(58) Field of Search ................................. 370/358, 389, 370/392, 462, 475, 328, 349, 420, 497

(56) References Cited

U.S. PATENT DOCUMENTS

| 5,339,316 A | * | 8/1994 | Diepstraten | 370/401 |
|---|---|---|---|---|
| 5,720,035 A | * | 2/1998 | Allegre et al. | 709/225 |
| 5,737,328 A | * | 4/1998 | Norman et al. | 370/331 |
| 6,130,896 A | * | 10/2000 | Lueker et al. | 370/469 |

* cited by examiner

Primary Examiner—Wellington Chin
Assistant Examiner—Brenda H. Pham
(74) Attorney, Agent, or Firm—Frank J. Bogacz

(57) ABSTRACT

A method for virtual end nodes indicates in routing information (51) that the routing information is a "special access" to a virtual end node (60). An RF network device then inserts the identity (52) of the physical end node into user information (62) and insert a filter field for selecting which virtual end node(s) are to respond to the user information (63). An end node (41) determines whether the user information is for it (69–72), then the end node 41 responds to the RF network (75), otherwise the end node 41 ignores the user information.

20 Claims, 3 Drawing Sheets

METHOD FOR SELECTING VIRTUAL END NODES IN AN RF NETWORK

BACKGROUND OF THE INVENTION

The present invention pertains to RF (radio frequency) networks and more particularly to an arrangement for supporting virtual end nodes in an RF network.

In an RF network where end nodes communicate with access points via wireless communications, data packets are typically sent to the end node by means of a specific address associated with each end node. The access point is the network device which communicates directly with end nodes. A data packet typically includes, at the beginning, the routing information. The routing information includes the MAC address of the next hop on the network and the IP (internet protocol) address of the ultimate destination end node.

In such a system, the internet protocol address of the destination end node must be registered in the routing tables in each of the RF repeaters and access points in order for messages to travel between end nodes. As a result, the number of end nodes permitted to an access point was fixed depending on the size of the field within the normal internet protocol packet. Thus, if more end nodes were to be added, more access points were required up to the limit of the field in the internet protocol defining the addresses of the access points. Adding access points requires further processing by the RF network, takes up space for additional hardware and is costly.

In addition, sometimes the transmission of data packets to a physical end node requires that the data packet be sent to a subset of physical end nodes served by a particular access point. One data packet would require separate transmissions to a number of physical end nodes and thus, a number of the same data packets would be sent through the network.

Accordingly, it would be advantageous to provide a method for extending the number of physical end nodes connectable to an RF network access point while selectively retaining the ability to transmit a data packet simultaneously to a group of physical end nodes in this extended configuration.

DESCRIPTION OF THE PREFERRED EMBODIMENT

Figure 1:
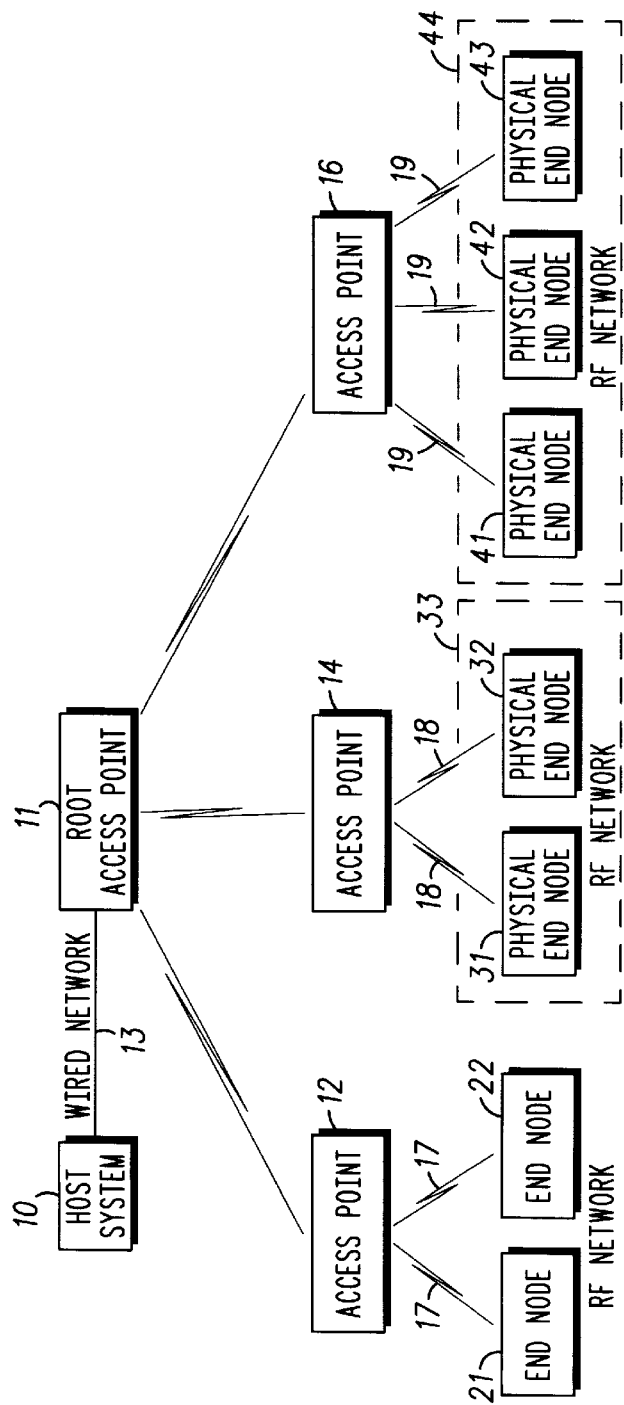
FIG. 1 is a block diagram of a virtual RF network for supporting extended end nodes in accordance with the present invention.

FIG. 1 depicts a conventional RF network system including standard end nodes and virtual end nodes. Host system 10 attempts to communicate with end node devices 21–43. End node devices 21 and 22 are standard RF end node devices. The RF network is organized so that access points communicate via RF links to end nodes.

To communicate via the RF network, host system 10, for example, transmits via a wired connection 13 to a root access point 11. The information transmitted by host system 10 may be buffered and is re-transmitted by root access point 11. Root access point 11 determines which lower level access point is to receive the message intended for an end node. Root access point 11 routes the message through access points 12, 14 or 16, for example. Root access point 11 transmits via an RF link the message packet intended for a particular end node through access point 12, 14 or 16.

In the typical RF network system, access point 12 then determines that the normal internet protocol (IP) routing information includes an address of either end node 21 or end node 22. As a result, access point 12 then via an RF link 17 transmits the information to the MAC address of the end node included in the normal internet protocol routing information. Only the particular end node addressed responds to the data packet. The data portion of the normal internet protocol packet is then processed as usual by the individual end node, 21 or 22 in this case.

The amount of data comprising the routing information is limited for this case of the normal internet protocol. As more and more end nodes are to be interconnected to the RF network, the number that may be connected to a particular access point is limited by the size of the address fields in the normal internet protocol routing information. See FIG. 2. The result is that more access points must be added to add more end nodes. Only a single end node can respond to a data packet. A method to add more end nodes for a given access point would greatly increase the system capacity and decrease the number of access points required for the system. In addition to being cost effective, having less access points in the system would take up less real estate and floor space in a distributed network approach. Both are highly desirable goals.

Figure 2:
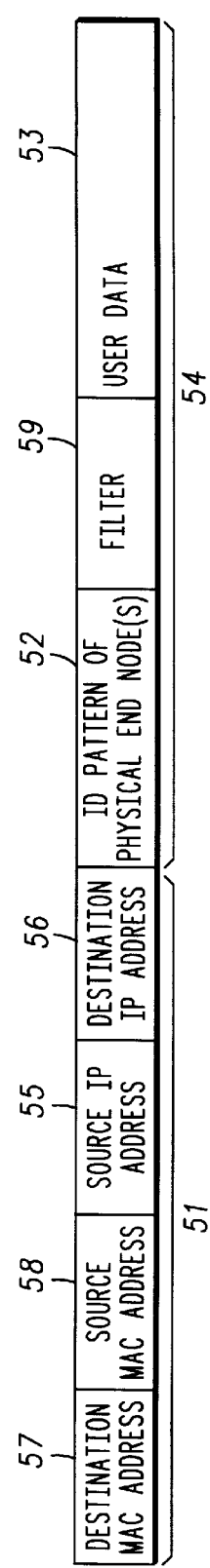
FIG. 2 is a layout of an internet protocol for routing of packets to virtual RF end nodes in accordance with the present invention.

Referring to FIG. 2, an RF packet in the RF network is shown with modifications in accordance with the present invention. The data packet 50 includes a normal internet protocol routing information 51 and a user data packet 54. The normal or traditional internet protocol data packet includes the identity of the recipient 56 and the identity of the original source 55. The present invention, in part, places the selection pattern for physical end node(s) to accept the data packet into a data field 52 of data packet 54. Bits in field 52 may be set to select a particular set of physical end nodes. A filter field 59 has a bit mask to indicate which bits of field 52 are to be used for later selections. The user data 53 comprises the remainder of data packet 54.

Each access point in the RF system has an internet protocol address. This internet protocol address is included within the normal internet protocol routing information 51.

Referring again to FIG. 1, each access point 12, 14 and 16 and root access point 11 implements full internet protocol addressing. Although only one root access point 11 and three access points 12, 14 and 16 are shown, there may be many of these associated with the system and may be several levels of root access points. Also, within the normal IP routing information 51 is the identity of the intended end node included in field 56. In this way, the access points 12, 14 and 16 or host system 10 or root access point 11 may select the identity of the particular end node to receive the message. In the present invention, the destination MAC address and destination IP address for the last hop from the access point are for the virtual end node device.

Next, for example, access point 16 transmits the data packet over RF direct to the destination virtual end node device. This RF transmission is received by each of its physical end nodes 41–43. Let us assume that the filter field 59 had been set to indicate that only physical end nodes 41 and 43 were to accept the message and that physical end node 42 was not to accept the data packet. Each physical end node 41–43 obtains the filter from field 59.

There are two embodiments of the selection procedure for physical end node's acceptance of the data packet. In the first embodiment, each physical end node logically ANDS the filter bit pattern field 59 with the ID pattern in field 52. Each physical end node 41–43 then logically ANDS the filter with the physical end node's identity. If the results of both AND operations are identical, the physical end node accepts the packet. In the second embodiment, the ID pattern field 52 is compared directly with the result of logically ANDing the filter field 59 with the physical end node's identity. This embodiment saves an AND operation but requires the user to specify bitwise 0's in positions within the ID pattern, field 52 for DONT CARE bits. DONT CARE bits are bits that can be either 0 or 1 in the physical end node ID and will still match.

Regardless of which embodiment is realized, physical end nodes 41 and 43 were the intended recipients, they will accept and process the data contained in field 53. End node 42 will not process, but ignore the data packet.

As can be seen, the effect of adding field 52 adds the ability to address many physical ends using a single MAC and IP address pair. Further, by combining field 59 which is a filter field and with either of the above embodiments, a method for selective reception of a data packet by a number of the physical end nodes associated with a particular access point is provided. The state of art would have transmitted the message many times, one to each end node for it to be decoded by that end node. Thus, system throughput of this RF network is greatly increased. Also, this scheme has the benefit that it does not disturb the field termed the normal internet protocol routing information 51. This is extremely important since this field has been standardized for use on any IP network.

Figure 3:
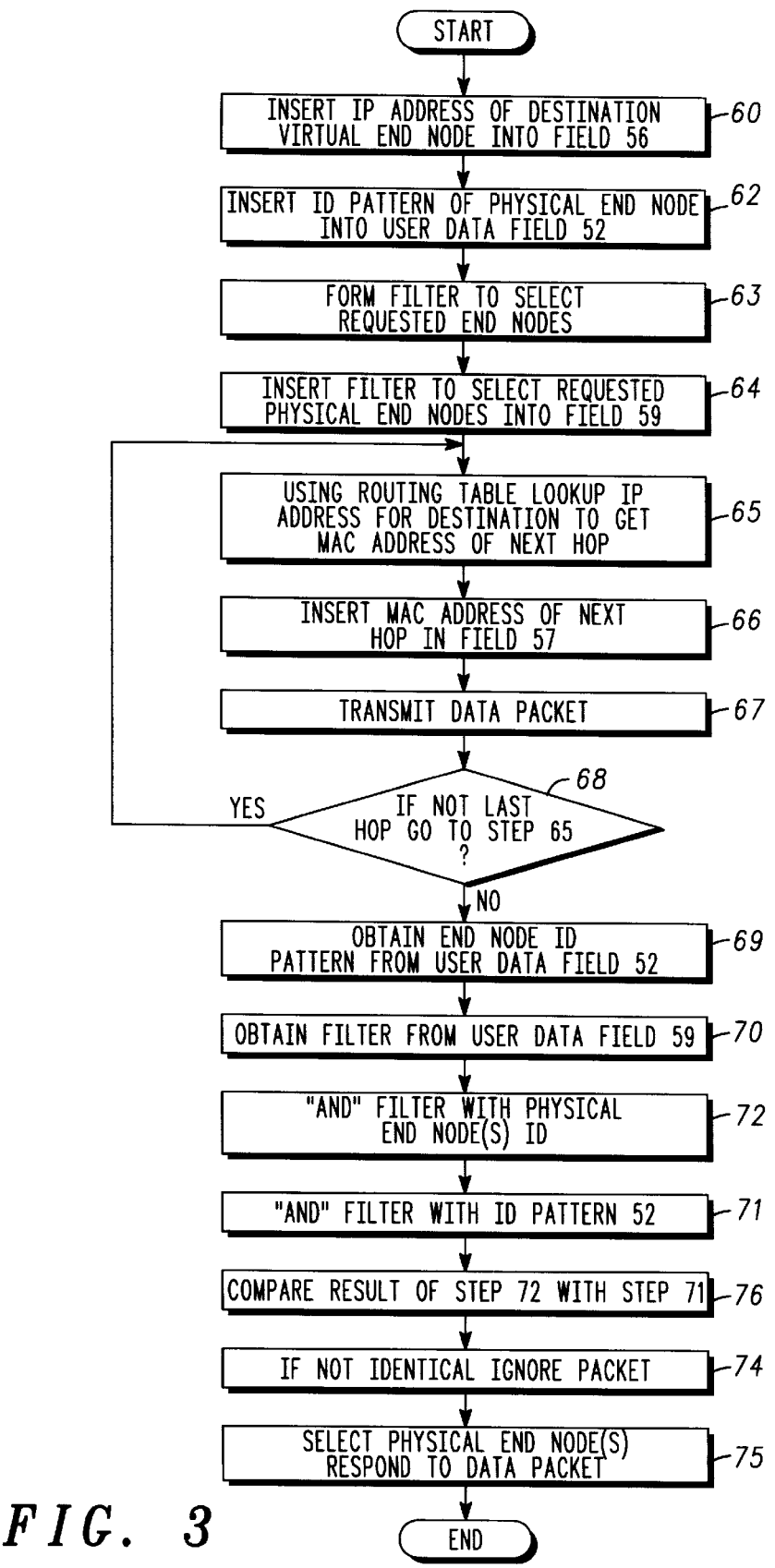
FIG. 3 is a flow chart of a method for broadcast to physical end nodes in accordance with the present invention.

Referring to FIG. 3, a flow chart of a method for physical end nodes in an RF network is shown. The method is started and block 60 is entered. The packet source builds up the packet as shown in FIG. 3 steps 60 through 64. The IP address of the destination virtual end node is inserted into field 56. The ID pattern for physical end node(s) is inserted in field 52. A filter is formed to select the appropriate bits and inserted in field 59. Using standard IP routing tables the MAC address of the next network hop is inserted into the destination MAC address, field 57, of the packet. The packet is then transmitted to the network. The packet is then routed from hop to hop using normal IP protocol until it is transmitted for the last hop from the access point over the RF link. This corresponds to steps 65 through 68.

Steps 69 and 70 extract the ID pattern and filter data from the packet.

In FIG. 3, steps 72, 71 and 76 test the packet to see if this physical end node should accept it. This corresponds to applying embodiment one from above.

Figure 4:
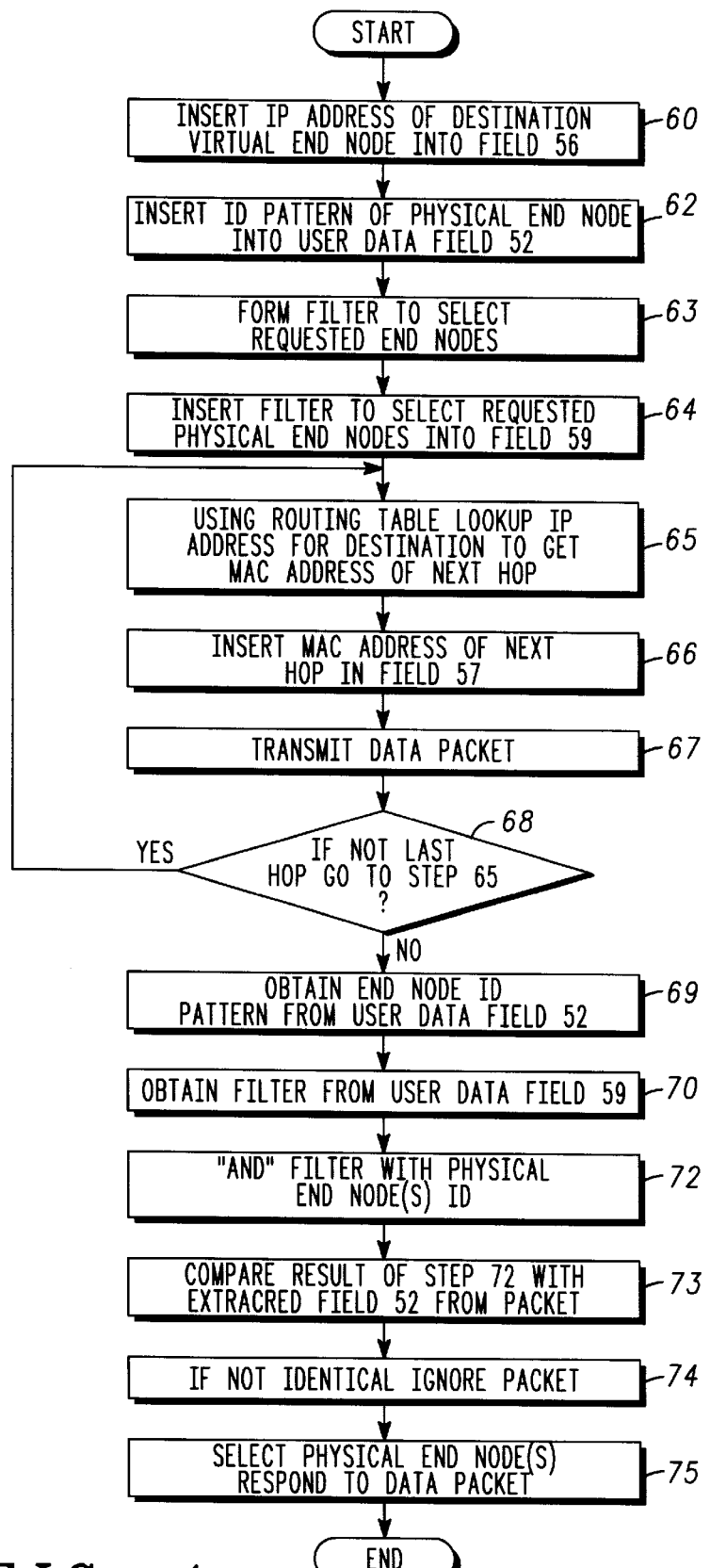
FIG. 4 is a flow chart of another embodiment for broadcast to physical end nodes in accordance with the present invention.

In FIG. 4, step 72 and 73 test the packet to see if this physical end node should accept it. This corresponds to applying embodiment two from above.

In step 74, the packet is ignored if it is determined that it is not for this physical end node. Otherwise the physical end node accepts and processes the data.

As can be seen from the above explanation, a number of physical end nodes may be added to the capability of any access point in a network. A single data packet may be effectively transmitted simultaneously to a number of the physical end nodes. Thereby saving substantial system throughput by sending the data packet only once through the network.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for selecting end nodes in an RF network, the method using a data packet including routing information and user data, the method for selecting end nodes in an RF network comprising the steps of:
    adding at least one end node;
    indicating within the routing information that the at least one end node is to receive the user data;
    inserting an identity of the at least one end node in an identity field within the user data;
    inserting a filter field in the user data;
    transmitting the routing information along with the user data through the RF network to an access point;
    transmitting by the access point the data packet; and
    determining by the at least one end node by combining the filter field and the identity field whether the at least one end node is to receive the user data.

2. The method for selecting as claimed in claim 1, wherein there is further included a step of processing the user data by a selected end node(s), if the at least one end node determined that the at least one end node is to receive the user data.

3. The method for selecting as claimed in claim 1, wherein there is further included a step of setting bits in the filter field corresponding to the at least one end node which is to receive the user data.

4. The method for selecting as claimed in claim 1, wherein there is further included a step of resetting bits in the filter field corresponding to the at least one end node which is to receive the user data.

5. The method for selecting as claimed in claim 1, wherein there is further included a step of obtaining by the at least one end nodes the identity field from the user data.

6. The method for selecting as claimed in claim 5, wherein the step of determining by the at least one end node includes the step of obtaining by the at least one virtual end node the filter field from the user data.

7. The method for selecting as claimed in claim 6, wherein the step of determining by the at least one end node includes the step of ANDing the filter field with a physical identity of the end node.

8. The method for selecting as claimed in claim 7, wherein there is further included a step of comparing a result of the step of ANDing with the identity field.

9. The method for selecting as claimed in claim 8, wherein there is further included a step of ignoring the data packet if the step of comparing results in a miscomparison.

10. The method for selecting as claimed in claim 9, wherein there is further included a step of responding by the end node to the RF network, if the step of comparing results in a comparison.

11. The method for selecting as claimed in claim 6, wherein the step of determining by the at least one end node includes a step of ANDing the filter field with the identity field in the user data.

12. The method for selecting as claimed in claim 11, wherein there is further included a step of comparing a result of the step of ANDing with the identity field.

13. The method for selecting as claimed in claim 12, wherein there is further included a step of ignoring the data packet if the step of comparing results in a miscomparison.

14. The method for selecting as claimed in claim 13, wherein there is further included a step of responding by the end node to the RF network, if the step of comparing results in a comparison.

15. The method for selecting as claimed in claim 1, wherein the steps of inserting the identity field and inserting the filter field are performed by an end node.

16. A method for selecting end nodes in an RF network, the method using a data packet including routing information and user data, the method for selecting end nodes in an RF network comprising the steps of:

adding at least one end node;

indicating within the routing information that the at least one end node is to receive the user data;

inserting an identity of the at least one end node in an identity field within the user data;

inserting a filter field in the user data;

transmitting the routing information along with the user data through the RF network to an access point;

transmitting by the access point the data packet;

determining by the at least one end node by combining the filter field and the identity field whether the at least one end node is to receive the user data;

determining by the at least one end node includes the step of ANDing the filter field with a physical identity of the end node; and determining by the at least one end node includes a step of ANDing the filter field with the identity field in the user data.

17. The method for selecting as claimed in claim 16, wherein there is further included a step of obtaining by the at least one end nodes the identity field from the user data.

18. The method for selecting as claimed in claim 17, wherein the step of determining by the at least one end node includes the step of obtaining by the at least one virtual end node the filter field from the user data.

19. The method for selecting as claimed in claim 18, wherein there is further included a step of ignoring the data packet if the step of comparing results in a miscomparison.

20. The method for selecting as claimed in claim 19, wherein there is further included a step of responding by the end node to the RF network, if the step of comparing results in a comparison.

* * * * *